UNITED STATES PATENT OFFICE.

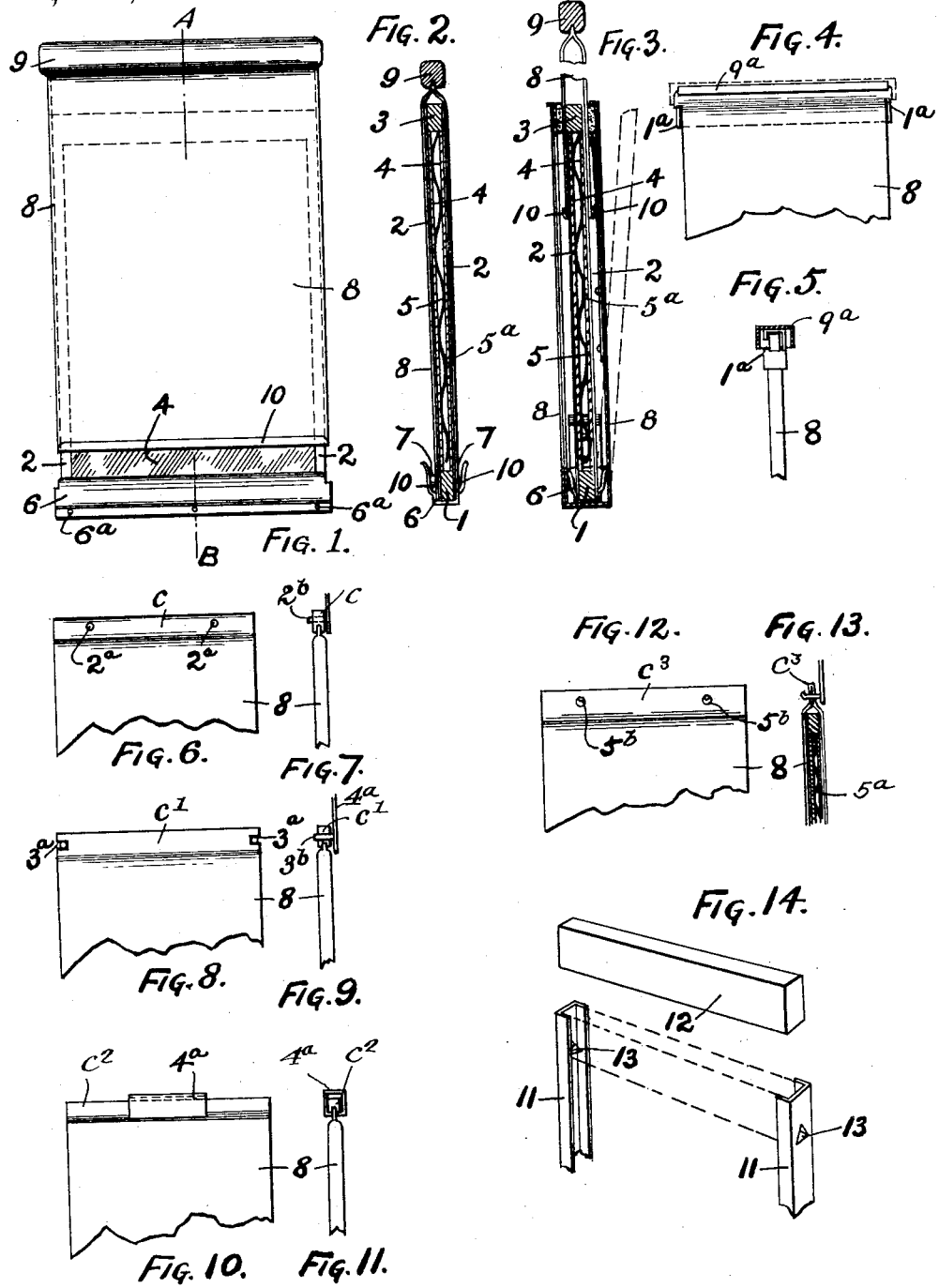

MAGNUS NIÉLL, OF DJURSHOLM, SWEDEN.

PLATE-PACK FOR PHOTOGRAPHIC APPARATUS.

1,162,385.

Specification of Letters Patent. Patented Nov. 30, 1915.

Application filed June 27, 1911. Serial No. 635,620.

*To all whom it may concern:*

Be it known that I, MAGNUS NIÉLL, a subject of the King of Sweden, residing at Djursholm, Sweden, have invented certain new and useful Improvements in Plate-Packs for Photographic Apparatus, of which the following is a specification.

This invention relates to improvements in light proof envelops for carrying photographic plates or films and means for enabling such plates or films to be exposed in the camera and to be again inclosed in a light tight manner in said envelop so as to enable same to be removed from the camera and, if desired afterward transferred to a daylight developing box.

For the purpose of exposing the sensitive plates contained in the said light proof envelops, I make use of a device known as an adapter, which is simply a hinged case provided on one side with an exposure aperture and at its open end with a suitable light trap to prevent fogging of the plates when making exposures. The said adapter, being similar to those in general use for this purpose, does not call for more than a passing reference.

The envelop is chiefly made of some cheap material such as paper or thin cardboard, that can be thrown away after use, and consists of an inner part provided with means for holding the plates in position, an outer part, taking the form of an opaque sheath or cover, adapted to slide telescopically over the said inner part, and means for facilitating its use in combination with daylight developing boxes such as referred to above.

In describing my invention in detail, reference is made to the drawings herewith in which—

Figure 1 is a front view of the envelop with the outer cover partly raised. Fig. 2 represents a sectional side view A—B of Fig. 1 of the envelop when closed, showing the sensitive plates in position. Fig. 3 is a similar view, the envelop having its outer cover or sheath partly raised while held in its adapter. Figs. 4 to 13 represent various methods of forming the top of the outer cover, and the manner of coupling the same to a holder in the developing box. Fig. 14 shows a modified plan for holding the plates in position by means of U-shaped side arms.

To a cross strip 1 of cardboard or other material, is fixed, on each side, a flexible open frame 2, 2, on one side of which, at its upper end, a second cross strip 3 is cemented.

The said strips 1 and 3 are of sufficient thickness to accommodate the sensitive plates 4, 4, and an opaque dividing plate 5, which is slightly corrugated as at $5^a$ for the purpose of preventing erratic movement of the plates and to keep them pressed up to the focal plane during exposure. The said dividing plate is not made integral with the inner part of envelop, but is placed between the plates prior to their insertion into the holder.

The first strip 1, with the open frames attached, is inserted into a metal cup or binder 6 and permanently fixed therein by depressions $6^a$ made in the metal with a pointed tool or by other suitable means.

The said metal cup or binder is formed with a funnel shaped opening 7, 7, which is designed to guide the lower end of the outer cover as the envelop closes.

The two flexible frames 2, 2, are each at one end, *i. e.* at the lower end (Figs. 1 to 3) attached to the cross-strip 1 (which may be of wood) while at the other end (*i. e.* at the upper end) only one of these strips 2 is attached to the cross-strip 3 (which may be of wood), the top end of the other flexible open frame 2 being unattached to the strip 3, *i. e.* same is left free so that when the outer cover or sheath 8 has been withdrawn the top end of the two frames 2, 2 can be moved apart and thus enable a sensitive plate (or film) 4 to be inserted on each side of the corrugated central partition or dividing-plate 5, so that when such plates or films 4, 4, have been placed in position the thick strip 3 can then be moved back so as to overlap the edges of said plates or films and serve to hold the same in position, and the outer cover or sheath 8, 8, is then slipped over the top end of these two open frames which are held pressed closely together with the strip 3 therebetween.

I sometimes substitute for the open frames, flanged U-shaped metal side arms 11, 11, Fig. 14, into which the sensitive plates with the opaque dividing plate slide, an end block 12, being then inserted to fill the space formed by the extensions of the side arms beyond the ends of the plates when in position. In adopting this plan, I form inwardly projecting tongues 13 on the side arms, to retain the plates and end block in position. In the process of filling, the side arms are strained slightly open to admit of the plates passing the said tongues, the end block is then placed in position so as to rest on the projecting tongues.

The outer cover or sheath 8, 8, may conveniently be made of thick black paper and is of suitable dimensions to freely slide over the inner part with its contained plates. The upper part of the said outer cover is provided with a cross piece 9 for the convenience of coupling this part of the envelop to a clip $9^a$ contained in the developing box above referred to, and to form a handle for manipulating the envelop when in the camera.

To enable the foregoing to be clearly understood, I have shown at $1^a$, $1^a$, Figs. 4 and 5, the manner in which the cross piece of the outer cover is held in the clip of the developing box and in Figs. 6 to 13 various alternative methods are shown which are as follows:—A cross piece $c$ provided with holes $2^a$, $2^a$, which engage over pins $2^b$ (as shown in Figs. 6 and 7), a cross piece $c^1$ with end slots ($3^a$, $3^a$,) to engage on pins $3^b$ (as shown in Figs. 8 and 9), a recessed cross piece $c^2$ to slide in a clip ($4^a$, Figs. 10 and 11), and an extension $c^3$ of the cover reinforced by compressing and cementing the front and back to form a double thickness which may be perforated to engage over pins $5^b$ fixed to a part of the developing box (as shown in Figs. 12 and 13). The edges at the open end of the outer cover are turned back to form narrow flanges, 10, 10, Figs. 2 and 3, which answer the double purpose of stops to prevent the cover from being entirely withdrawn from the inner part of envelop when in the camera, and also to act as a light proof connection with the metal cup or binder when the envelop is closed.

What I claim is:—

1. A light-proof plate-pack, comprising a plate-holder formed of two open frames, connected by a cross-piece and a metal binder provided with outwardly-flaring sides, a partition for separating the sensitive plates therein and an outer cover or sheath for sliding over said parts.

2. A light-proof plate-pack, comprising a plate-holder formed of two open frames connected by a cross-piece and a metal binder having outwardly-flaring sides, a partition for separating the sensitive plates therein, an outer cover sliding over said parts, and means on said outer cover for coupling the latter with a developing box.

In witness whereof I have hereunto set my hand in presence of two witnesses.

MAGNUS NIÉLL.

Witnesses:
HEDWIG MELINDER,
HOWARD NASTROM.

Copies of this patent may be obtained for five cents each, by addressing the "Commissioner of Patents, Washington, D. C."